Oct. 13, 1959   H. C. DICKEY   2,908,536
BEARING SEAL
Filed Sept. 3, 1957

INVENTOR
Herbert C. Dickey
By Edward H. Goodrich
HIS ATTORNEY

United States Patent Office 2,908,536
Patented Oct. 13, 1959

2,908,536
BEARING SEAL

Herbert C. Dickey, Forestville, Conn., assignor to General Motors Corporation, Detroit, Mich., a corporation of Delaware Application September 3, 1957, Serial No. 681,701

7 Claims. (Cl. 308—187.1)

This invention relates to seals and particularly to a demountable seal for closing the end of an antifriction bearing to retain lubricant within the bearing and to prevent dirt, dust and water from entering the bearing.

It has been common practice for many years to rotatably support the hubs of motor vehicle front wheels on axles by means of antifriction bearings such as ball or roller bearings wherein the inner race ring of the bearing is non-rotatably fitted over the wheel axle and the outer race ring seats within and rotates with the wheel hub. The annular space between the inner end of the wheel hub and the axle has always been difficult to seal to protect the bearings from the damaging effects of dust, dirt and often water which is thrown against the inner end of the hub much of the time during operation of the vehicle. These bearings quickly fail when even small amounts of dirt, water or other deleterious material enter the bearings. Also, leakage of lubricant from the bearing past the seal can shorten bearing life and result in bearing failure.

It is, therefore, an object of this invention to provide an improved seal for closing the end of an antifriction bearing to prevent the entrance of dirt within the bearing and for retaining lubricant within the bearing.

Another object is to provide an improved demountable resilient seal which effectively closes the end of an annular lubricant chamber in a bearing against leakage and which may be quickly removed and easily replaced without damage to the bearing.

A still further object of my invention resides in the provision of a simply constructed inexpensive inherently resilient seal that may be easily installed and removed from a bearing and which has unusually effective sealing characteristics in the presence of dirt and water.

To these ends and also to improve generally upon devices of this character, my invention consists in the various matters hereinafter described and claimed. In its broader aspects, the invention is not necessarily limited to the specific structure selected for illustrative purposes in the accompanying drawings wherein:

Figures 1, 2:
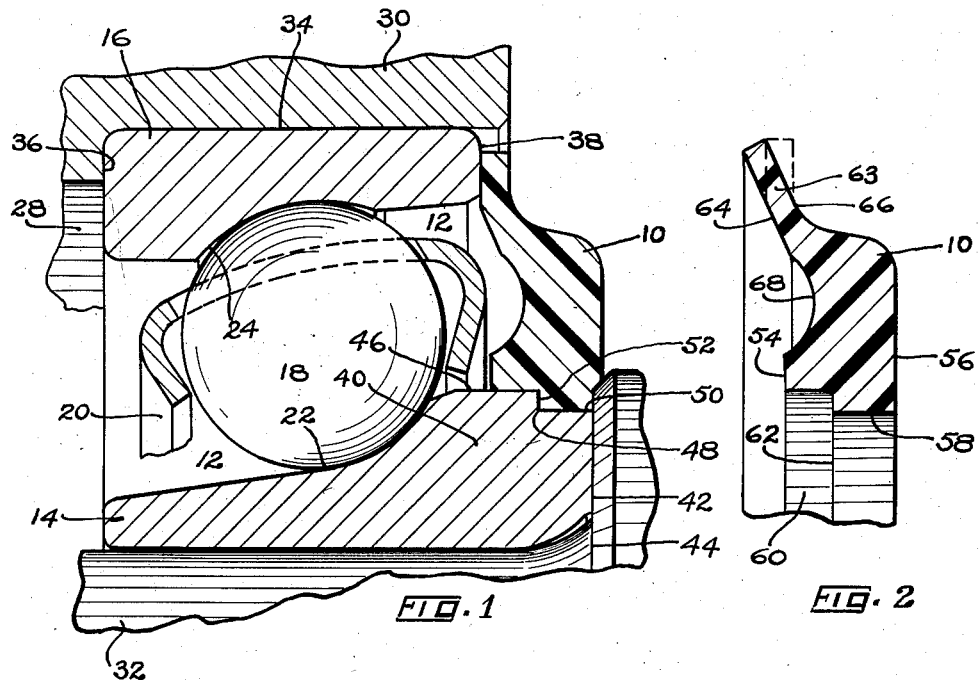
Figure 1 is a fragmentary cross sectional view showing my seal mounted on a bearing in a wheel hub.
Figure 2 is a fragmentary sectional view of my seal.
Figure 3:
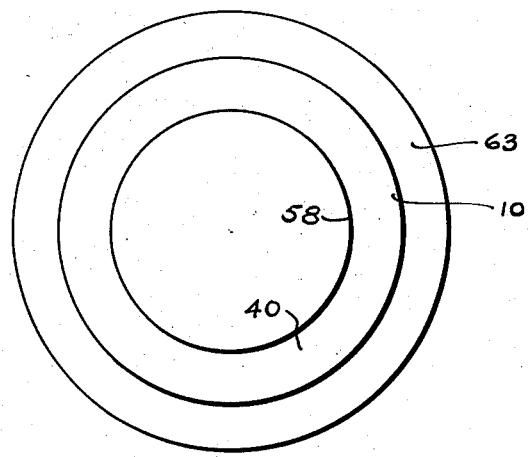
Figure 3 is an end view of the seal.

My improved seal, generally indicated at 10, is illustrated in closing relation across the end of an annular lubricant chamber 12 between a pair of relatively rotatable inner and outer race rings 14 and 16 of an antifriction bearing herein illustrated as a ball bearing having a circumferential series of spaced rolling elements as balls 18, guided by an annular separator 20. These balls, in accordance with usual practice may roll against inner and outer annular raceways 22 and 24 to provide for relative antifrictional rotation between the race rings. In view of the fact that my improved seal is particularly effective in protecting the front wheel bearings in automotive vehicles, the ball bearing is shown mounted in one end of the bore 28 of a rotatable wheel hub 30 and supporting a non-rotatable axle 32. The outer race ring 16 is pressed into a counterbore 34 against an annular shoulder 36. The outer annular end face 38 of the race ring 16, which may be flat, preferably lies within the end of the counterbore 34 to protect the flexible lip of the seal 10 as will hereafter appear.

The inner race ring 14, which is pressed into non-rotatable fitting engagement over a reduced cylindrical portion of the axle, has an annular portion 40 axially projecting beyond the inner end face 38 and terminating in an end face 42 abutting against a flat annular shoulder 44 on the axle. The annular portion 40 is provided with a cylindrical land 46 adjacent the raceway 22 and the outer end of the portion 40 is provided with an annular notch 48 which preferably has a cylindrical bottom wall 50 and a generally radial end wall 52.

The sealing member 10 comprises an inherently resilient rubber-like washer which may be suitably formed as by a molding operation and vulcanized to provide the required resiliency. This rubber-like material should not be detrimentally affected by bearing lubricants, heat or light. One satisfactory material for my seal comprises a resilient vulcanized synthetic rubber containing a polymerization product of butadiene and acrylic nitrile and/or a copolymer of butadiene and styrene. The sealing washer 10 has a body portion provided with generally radial inner and outer side walls 54 and 56 and a central bore 58. A counterbore 60, coaxial of the bore 58 extends inwardly from the side wall 54 and terminates in a flat annular shoulder 62. A thin resiliently flexible sealing lip 63 projects angularly outwardly from the body portion and preferably has generally uniformly spaced inner and outer side walls 64 and 66. The wall 66 blends into the periphery of the body portion. A transversely arcuate annular wall 68 extends between the inner end of the wall 64 and the wall 54 to provide more capacity to the lubricant chamber 12 and to aid the free flexibility of the lip 63.

The seal before installation has its lip 63 assume a generally frusto-conical form as indicated in Figure 2. The diameter of the counterbore 60 is slightly less than that of the land 46 and the diameter of the bore 58 is slightly less than that of the cylindrical race ring wall 50. Also, the axial distance between the annual shoulder 62 and the seal wall 56 slightly exceeds the axial length of the notch 48. With this arrangement, the inherent resiliency of the sealing washer will make it easy to stretch the washer into tightly fitting sealing relation over the notch 48 and against the shoulder 52 before installation of the bearing in operative position. At this time the resilient sealing lip 63 will be laterally deflected into substantially flat wiping sealing engagement with the end face 38 of the outer race ring 16 as illustrated. When the bearing is mounted over the axle 32, the portion of the seal body within the notch 48 will be deformably clamped in sealing engagement between the shoulders 44 and 52. With this arrangement, the non-rotatable seal will be securely but demountably retained in sealing position and the resilient wiping relation between the outer race ring 16 and the flexible sealing lip will effectively prevent leakage of lubricant from the chamber 12 as well as preclude the entrance of dirt, dust, water and other deleterious material past the seal and into the bearing. The depth of the counterbore 34 is preferably so selected that the flexible sealing lip will be protected by locating within the end of this counterbore.

I claim:

1. In a closure for protecting the end of a bearing which supports a shaft within a rotatable hub, a rotatable outer bearing ring mounted within the hub and having an annular end face, an inner bearing ring mounted on the shaft and having an end extending axially outwardly beyond said annular end face and abutting against an annular shaft shoulder, a sealing washer fitted over the inner ring extension and deformably clamped in sealing engagement against the shaft shoulder, and an inherently resilient annular sealing lip on the sealing washer in yieldable side-wiping sealing engagement with said annular end face of the outer bearing ring.

2. In a closure for protecting the end of a bearing which supports a shaft within a rotatable hub, an outer bearing ring mounted within the hub and having an annular end face, an inner bearing ring mounted on the shaft and having and end abutting an annular shoulder on the shaft, said inner ring having an annular notch terminating at its inner end in a shoulder and terminating at its outer end in said shaft shoulder, an annular resilient washer sealingly fitted over the end of the inner ring and deformably clamped between the shaft shoulder and the inner ring shoulder, and a yieldably resilient frusto-conical lip on the washer in laterally wiping sealing engagement with the annular end face of the outer ring.

3. In a closure for protecting the end of a bearing which supports a non-rotatable shaft within a rotatable hub, an outer bearing ring mounted within the hub and having an annular end face, an inner bearing ring mounted on the shaft and having an end abutting an annular shaft shoulder, said inner ring having an annular notch extending from an annular shoulder on the inner ring to the end of said inner ring, an inherently resilient washer sealingly fitted over the end of the inner ring and having a portion compressibly clamped between and in engagement with the shoulders at the ends of said notch, and an initially frusto-conical resilient lip on the washer laterally sprung into side-wiping sealing engagement with the annular end face of the outer bearing ring.

4. In a closure for protecting the end of a bearing which supports a non-rotatable shaft within a rotatable hub, an outer bearing ring peripherally seated within and supported by the hub and having an annular end face, an inner bearing ring mounted on the shaft and having an end abutting an annular shaft shoulder, rolling elements between the rings, said inner ring having an annular notch extending from the shaft shoulder to an annular inner ring shoulder, an inherently resilient sealing washer having a body portion compressibly seated over the end of the inner ring, a radially inwardly projecting annular sealing washer portion compressibly received in said notch and deformably clamped between said shoulders, and an annular resilient lip extending radially outwardly from the body portion and angularly deflected into yieldable side wiping engagement with the annular end face of the outer bearing ring.

5. In a closure for protecting the end of a bearing which supports a non-rotatable shaft within a rotatable hub, an outer bearing ring mounted in the hub and having an annular end face located within the hub, an inner bearing ring mounted on the shaft and having an end portion projecting outwardly beyond the end face of the outer ring into abutting engagement with an annular shaft shoulder, said inner ring having an annular notch extending from the shaft shoulder to an annular shoulder on the inner ring, a demountable sealing washer of inherently resilient material having a body portion compressibly fitting over the projecting end portion of the inner ring, an annular sealing washer portion extending radially inwardly from the body portion and compressibly fitting within the notch and compressibly clamped between said annular shoulders, and an initially frusto-conical sealing lip projecting outwardly from the body portion and deformed into yieldable side-wiping contact with the annular end face of said outer bearing ring.

6. In a closure for demountable positioning across an annular lubricant chamber between a pair of relatively rotatable members one of which has an annularly extending notch, an inherently resilient sealing washer having an annular body, an annularly extending portion radially projecting from the body for compressibly fitting within said notch, and a generally frusto-conical annular sealing lip extending outwardly from the body portion, said lip being adapted to laterally and resiliently deform into generally radially disposed side wiping sealing engagement with an annular end wall on the other of said relatively rotatable members.

7. In a closure for demountable positioning across an annular lubricant chamber between a pair of relatively rotatable inner and outer members, said inner member having an annular notch, an inherently resilient sealing washer having an annular body for compressibly and demountably fitting over an end of said inner member, an annular seal portion radially extending inwardly from the body portion at one side of the body portion, said projection being larger in size than and corresponding in shape to the notch for compressibly and sealingly seating therein, and a resiliently flexible annular sealing lip projecting frusto-conically outwardly from the periphery of the body portion, said lip being arranged to laterally and sealingly seat against an end face on said outer member.

References Cited in the file of this patent

UNITED STATES PATENTS

| | | |
|---|---|---|
| 2,310,607 | Batesole | Feb. 9, 1943 |
| 2,391,007 | Buckendale | Dec. 18, 1945 |
| 2,750,238 | Black | June 12, 1956 |

FOREIGN PATENTS

| | | |
|---|---|---|
| 866,321 | Germany | Feb. 9, 1953 |